INVENTOR.
David C. Boyd

United States Patent Office 3,778,335
Patented Dec. 11, 1973

3,778,335
SODIUM ALUMINOSILICATE GLASS ARTICLE STRENGTHENED BY A SURFACE COMPRESSIVE STRESS LAYER
David C. Boyd, Corning, N.Y., assignor to Corning Glass Works, Corning, N.Y.
Filed Sept. 2, 1971, Ser. No. 177,345
Int. Cl. B32b 33/00
U.S. Cl. 161—164    4 Claims

ABSTRACT OF THE DISCLOSURE

Improved glass compositions are described for a sodium aluminosilicate glass article having a surface compressive stress layer that strengthens the article. The surface compressive stress layer is chemically developed by an ion exchange in which a relatively large monovalent ion is introduced into the surface of the glass article in exchange for the sodium ion at a temperature below the strain point of the glass. The improved compositions provide glasses having unusual liquidus characteristics, and consist essentially, on an oxide basis in mole percent, of 5–25% $Na_2O$, 1–5% $MgO$, an amount of $ZrO_2$ effective to improve chemical durability of the strengthened glass but not over 3%, at least 8% $Al_2O_3$, the total $ZrO_2$ plus $Al_2O_3$ being not over 13.5%, and the balance essentially silica.

---

Figure 1:
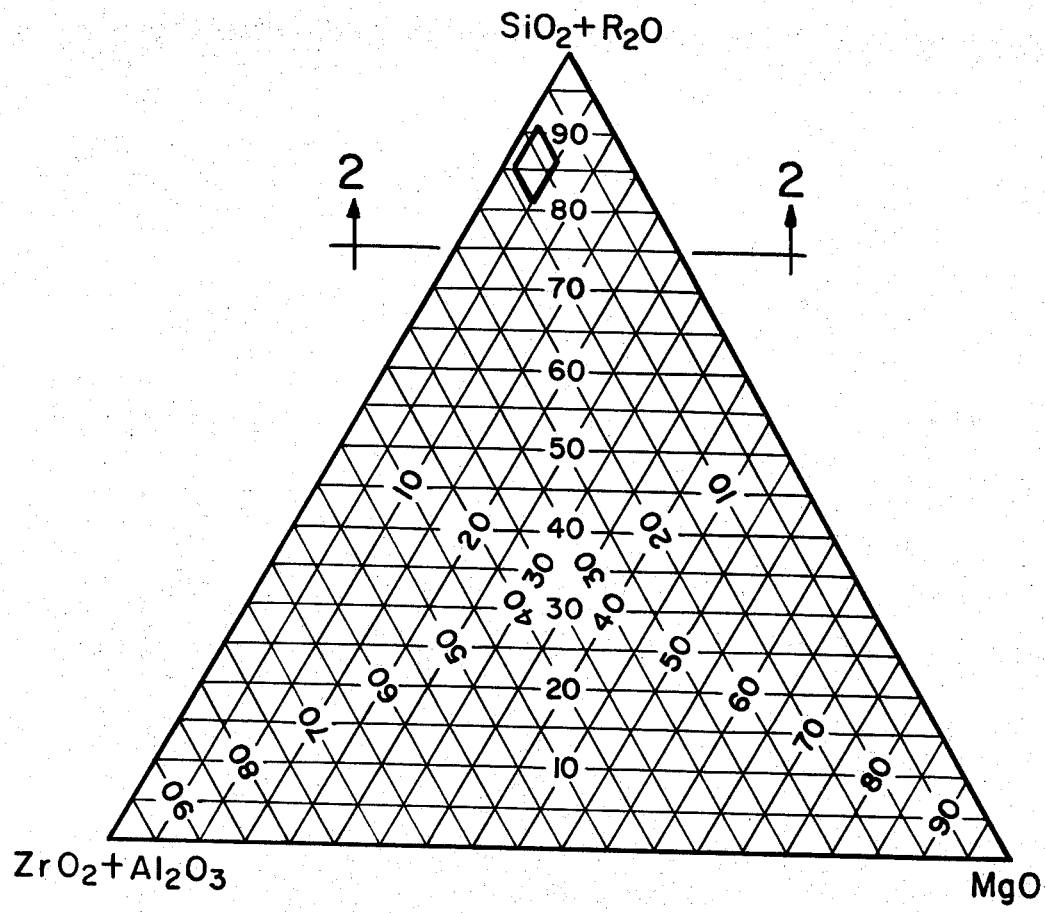

The invention relates to a glass article strengthened by a surface compressive stress layer. It is particularly concerned with an article wherein the surface compressive stress layer is chemically developed by an ion exchange at a sufficiently low temperature to avoid stress release, and wherein the article is composed of a sodium aluminosilicate glass having a composition within narrowly defined range to impart specific properties, in particular unusual liquidus characteristics.

British Pat. No. 966,733 describes the strengthening effect achieved in alkali metal aluminosilicate glass articles by a low temperature ion exchange process. In this type of strengthening process, a relatively large monovalent ion, such as potassium, is introduced into the glass surface in exchange for a smaller ion, such as sodium. The exchange is effected at a temperature near or below the strain point of the glass in order to avoid release of the stress developed by the exchange. Articles composed of alkali metal aluminosilicate glasses are unusual in that strengthening stresses developed in such articles by the low temperature ion exchange are retained even after the article surface is severely abraded either in service or in prescribed tests. Accordingly, glass articles having this type of strength characteristic are referred to as having increased abraded strength.

U.S. Pat. No. 3,485,702, granted to E. I. Mochel on Dec. 23, 1969, discloses application of the low temperature ion exchange strengthening process to alkali metal zirconosilicate glass articles wherein the glass composition contains 5–25% by weight $ZrO_2$ and optionally contains up to 20% $Al_2O_3$, the total $ZrO_2$ plus $Al_2O_3$ being 5–25%. The presence of at least 5% $ZrO_2$ in a silicate glass composition is described as having a corresponding effect to the presence of such amount of $Al_2O_3$ insofar as enhancing the ability to have abraded strength imparted to the article.

U.S. Pat. No. 3,357,876, granted Dec. 12, 1967 to D. W. Rinehart, is concerned with the strengthening of glass articles composed of $Na_2O$-$Li_2O$-$P_2O_5$-$Al_2O_3$-$SiO_2$ glasses characterized by 1 to 25% by weight of $P_2O_5$ in their compositions. The patent discloses that one of several optional ingredients in its compositions is up to 8% by weight $ZrO_2$. The process of $ZiO_2$ in the glass is said to increase the depth of ion exchange penetration, to reduce the tendency for phase separation to occur, and to increase the acid durability of the glass.

British Pat. No. 1,171,527, granted Mar. 17, 1970 to Corning Glass Works, discloses specific improvements in alkali metal zirconosilicate and aluminosilicate glasses for strengthening purposes. In particular, it discloses the addition of 1–5% by weight $MgO$ to lower the melting point and steepen the viscosity curve of the base glass. It also discloses the addition of up to 5% $K_2O$ to lower the melting point of the glass. The present invention is an improvement on the glasses of this patent, and provides specific features not disclosed there.

Certain inadequacies in the previously disclosed glasses became apparent when efforts were made to use them in producing strengthened glass articles by the low temperature ion exchange method. The present invention is based on remedial measures discovered for these inadequacies.

The simple alkali metal aluminosilicate glasses, which are peculiarly adapted to low temperature ion exchange strengthening, generally have high melting temperatures. It is disclosed in the British patent mentioned above that the melting temperature can be depressed by adding potassia ($K_2O$) to the glass composition. It has now been found that small additions of $K_2O$ also improve the strengthening potential of a glass, but that such additions should be limited to about five (5) mole percent. The optimum effect on strengthening potential is usually obtained with a $K_2O$ addition of about four (4) mole percent, while an adverse effect on this property is encountered with an addition in excess of five (5) mole percent.

Attempts at realizing the benefits of $K_2O$ as a glass additive revealed that the surface of the resulting glass underwent a severe loss of chemical durability. This loss of chemical durability was particularly severe in the surface of a glass article following the ion exchange treatment. Poor chemical durability manifests itself as a large weight loss from an article surface when that surface is exposed to an aqueous medium. The surface attack may also produce a matte-like or cloudy surface that interferes with visibility through the glass. It occurs in the absence of $K_2O$ in the glass composition, but seems to be aggravated by the presence of this oxide.

It has now been found that small additions of zirconia ($ZrO_2$) to the glass composition will remedy this deficiency in durability. The $ZrO_2$ addition greatly improves the chemical durability of a glass surface, and also steepens the viscosity curve somewhat. However, additions of $ZrO_2$ above about three (3) mole percent cause a sharp increase in the glass liquidus temperature, and also slightly diminish the strengthening potential of the glass.

Prior to the present invention, it has been commonly accepted that $ZrO_2$ is difficult to properly dissolve in a glass melt. Accordingly, serious efforts have been made to avoid this oxide in batch materials. In fact, extensive studies have been made to provide glass tank refractories that avoid zirconia stoning, that is the sloughing off into a glass melt of small zirconia particles that remain undissolved by the glass.

Even when completely dissolved in a melt, zirconia is prone to crystallize during cooling of a glass melt. This crystallization is commonly referred to in the glass art as devitrification. In the course of studying this devitrification potential of $ZrO_2$, a very surprising discovery was made. It was found that the potential virtually disappears in certain glasses wherein the content of $MgO$ and the content of $ZrO_2$ plus $Al_2O_3$ are each carefully maintained below certain maximum values.

Subsequent studies were made using several phase diagrams appearing in "Phase Diagrams for Ceramists" published by the American Ceramic Society in 1964 and supplemented in 1969. As explained later, these studies suggest that the present composition limits define an area in which, with respect to glass liquidus temperature, at least one of two favorable effects is occurring. First, the area is one in which crystal formation changes from a magnesian crystal (forsterite) to a soda feldspar type crystal, principally albite. Apparently, the latter type of crystal formation is inhibited in the glasses involved. Second, in that portion of the area where forsterite crystals still form, they are soluble at lower temperatures, thereby providing lower liquidus temperatures. Thus, the composition area defines an unexpected "hole," or depressed area, in the liquidus pattern of

glasses. The practical effect is to provide a narrow composition area wherein $ZrO_2$ can be used to improve chemical durability without creating a glass crystallization problem.

My invention then is a strengthened sodium aluminosilicate glass article containing a relatively large monovalent metal ion selected from the group consisting of silver and alkali metal ions larger than sodium, and having a surface compressive stress layer of a depth of at least five (5) microns and an interior portion, the concentration of the large monovalent metal ion being greater in the surface layer than in the interior portion of the article and the concentration of sodium ion being greater in the interior portion of the article than in the surface layer thereof, the glass article being characterized in that the interior portion has a composition consisting essentially, in mole percent on the oxide basis, of 5–25% $Na_2O$, 1–5% $MgO$, an amount of $ZrO_2$ effective to improve chemical durability of the strengthened glass but not over 3%, at least 8% $Al_2O_3$, the total $ZrO_2$ plus $Al_2O_3$ being not over 13½%, and the balance being essentially silica. The invention further resides in an improved method for making a strengthened sodium aluminosilicate glass article in which sodium ions in a surface layer of the article are replaced by larger monovalent metal ions selected from the group consisting of silver and alkali metal ions larger than sodium by bringing the surface of the glass article into contact with a source of said larger monovalent metal ions while maintaining the glass at a temperature within about 200° C. of the strain point of the glass, but not above that temperature, until the surface of the glass article is placed in compression to a depth of at least five (5) microns, wherein the article to be strengthened is formed from a sodium aluminosilicate glass consisting essentially, in mole percent on the oxide basis, of 5–25% $Na_2O$, 1–5% $MgO$, an amount of $ZrO_2$ effective to improve chemical durability of the strengthened glass but not over 3%, at least 8% $Al_2O_3$, the total $ZrO_2$ plus $Al_2O_3$ being not over 13½%, and the balance of the glass being essentially silica.

Figure 2:
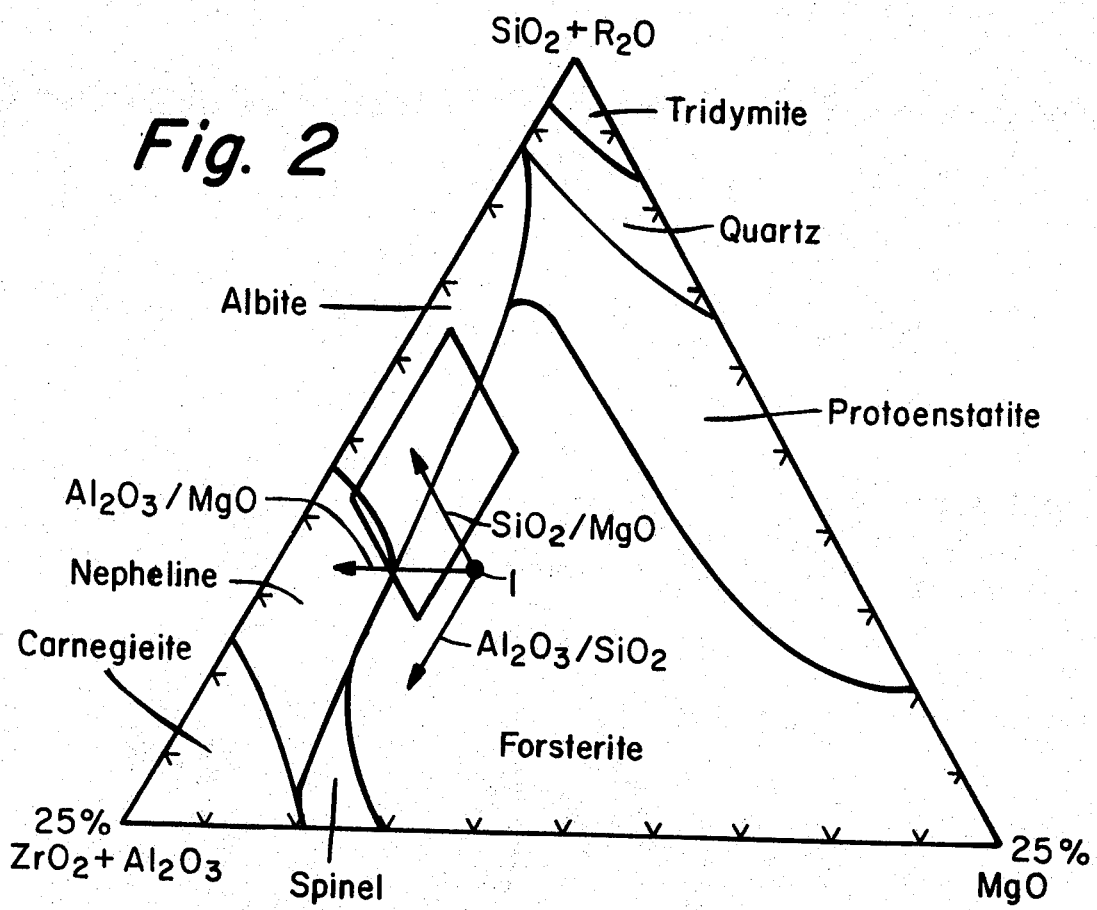
Figure 3:
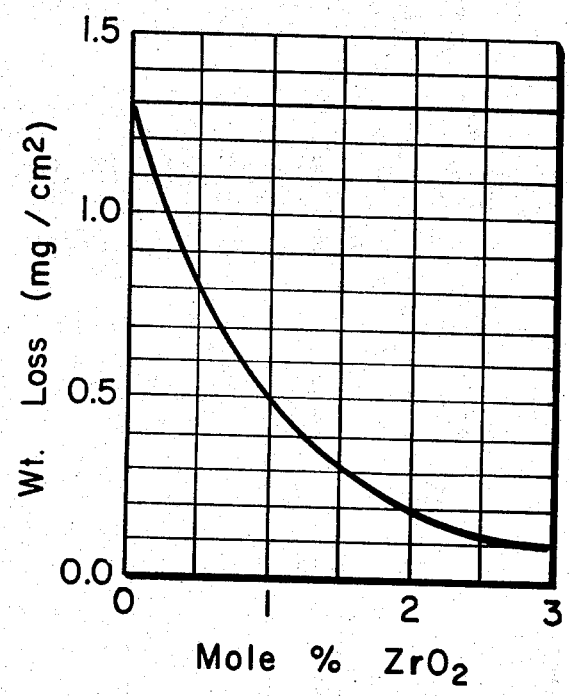

The invention is further described with reference to the accompanying drawings wherein, FIG. 1 is a ternary composition diagram illustrating the compositions of the invention, FIG. 2 is an enlarged view of an upper portion of FIG. 1 above line 2–2 in FIG. 1, and FIG. 3 is a graphical illustration of a particular feature of the invention.

In the ternary diagram of FIG. 1, the right-hand end of the base line represents 100% MgO, whereas the left-hand end of the line represents 100% total content of $ZrO_2$ plus $Al_2O_3$. The remainder of the glass composition, essentially $SiO_2$ plus $R_2O$, becomes 100% at the apex of the graph. The small, diamond-shaped area in the upper part of FIG. 1 defines the composition limits of the present invention.

The enlarged diagram of FIG. 2 encompasses the area above the line 2–2 in FIG. 1 wherein the apex or peak represents a specific ratio of $SiO_2$ to $Na_2O$ wherein $SiO_2$ is 78.3 mole percent and $Na_2O$ plus $K_2O$ is 21.7 mole percent. The right-hand end of the base line then represents a composition containing 25% MgO and 75% $R_2O$-$SiO_2$ in the indicated ratio while the left-hand end of the line represents a corresponding composition except with 25% $ZrO_2$ plus $Al_2O_3$ and no MgO. The composition limits of the invention again appear as a diamond-shaped region, but larger.

In FIG. 2, approximate boundary lines have been sketched, on the basis of available phase diagrams mentioned earlier, to indicate the type of crystal formation that may be expected to occur as melts having compositions represented in the figure are allowed to cool. The boundaries will change somewhat with changing alkali-silica ratios, but this diagram gives an approximation for such other ratios, and is itself based on composition examples set forth subsequently.

The arrows in FIG. 2 indicate the change in crystallization tendencies that can be expected with three different types of oxide substitution in a base glass identified as 1 and having the composition of Example 1, infra. In particular, decrease in MgO tends to improve liquidus conditions. In the right-hand half of the diamond-shaped composition area of the invention, forsterite crystals may be expected, but the liquidus temperature decreases as a composition shift to the left occurs. This is a function of solubility. In the left-hand half, albite crystals may be expected. Here, crystallization is sufficiently inhibited that devitrification generally presents no problem. Outside the enclosed area, it will be noted that forsterite crystals generally form. Further, their solubility is such that high liquidus temperatures, e.g. 1000–1300° C., are encountered.

In the practice of the invention, a glass-forming batch of the desired composition is compounded, the components thoroughly mixed together, and then melted. The melt is then simultaneously cooled to a glass and an article of a desired configuration shaped therefrom. The article produced is thereafter subjected to a chemical strengthening process wherein a source of monovalent ions having an ionic diameter greater than sodium is brought into contact with a surface of the article at an elevated temperature below that at which stress relaxation occurs. Stress release is a function of time and temperature, and temperatures above the strain point of the glass cause too rapid relaxation of stresses to be useful in the strengthening process. Therefore, treating temperatures at and, preferably, ranging 50°–200° C. below the strain point of the glass are utilized.

A convenient manner of strengthening treatment contemplates immersing the article in a molten bath of a salt containing the larger monovalent ion which is to be exchanged with the sodium ion in the glass, the salt bath being maintained at a temperature about 50°–200° C. below the strain point of the glass to be strengthened. Typically, for the glasses of this invention, the treatment may be for a period of time varying from about 2–16 hours at a temperature within the range 350°–550° C. For commercial practice, potassium ions are exchanged for sodium ions, a useful product being obtained through a 5–6 hour immersion of the glass article in a molten potassium nitrate ($KNO_3$) bath operating at 525° C. The glass articles of this invention exhibit a modulus of rupture in excess of 30,000 p.s.i.

The depth of the ion exchanged surface layer is a function of the time of treatment and the temperature at which the ion exchange is conducted. The depth of the ion exchanged layer required for any given service application is dependent upon the degree or severity of surface abrasion encountered in that application. For example, a depth of 5 microns can be adequate where the article will be subject to essentially no abrasion. However, where the article will be subject to mild abrasion, such as that simulated by rubbing with 150 grit abrasive paper, a depth of 20–25 microns will be required to insure against loss of strength due to a crack penetrating through the compressive stress layer. Finally, where the service application entails severe abrasion, such as is simulated in a tumble abrasion test, a depth of layer of 80 microns or more may be required.

The invention is further described and illustrated with reference to several comparative sodium aluminosilicate glasses, the compositions of which are set forth in the tables that follow. Each glass composition is set forth in mole percent on an oxide basis and the corresponding composition in weight percent set forth in a subsequent table. Each of the tables sets forth several glasses, some within and some without the characteristic ranges of the present invention. In each case, the purpose is to illustrate the significant improvements achieved by employing glasses within the characteristic ranges of the invention.

A glass batch was formulated in terms of available raw materials on the basis of each composition set forth in the tables. Typical batch materials include dry sand, nepheline syenite, sodium carbonate, sodium nitrate, dry magnesium oxide, milled zirconium silicate, dry potassium carbonate and arsenic trioxide. The batch ingredients were mixed and melted in platinum crucibles for 16 hours at 1550° C. The melts were then stirred and a variety of glass shapes formed therefrom. These included one-quarter inch cane drawn from the melt, 6" x 6" cast blocks, and one-quarter inch thick plate.

Temperature-viscosity measurements were made. These included the conventional strain point, shown in the tables in degrees centigrade (° C.), and an indicator of melting temperature, shown as the temperature in degrees centigrade (° C.) at which the glass viscosity was 1000 poises, "$T_{1000\ poise}$." Liquidus measurements, shown in degrees centigrade as "Liq. (° C.)," were made by placing crushed glass in a platinum boat and inserting the boat in a gradient temperature furnace. The temperature varied between 650° C. and 1350° C. along the length of the boat, and the glass was held under these conditions in the furnace for at least 24 hours. At this time, the point at which crystallization had occurred along the glass (if any), as well as the temperature corresponding thereto, was observed.

Several 4" lengths of cane of each glass were immersed in a potassium nitrate ($KNO_3$) salt bath operating at 525° C. and maintained therein for a period of six (6) hours. The cane were then removed from the bath, washed and dried preliminary to the making of modulus of rupture (MOR) measurements in conventional manner. These measurements are shown as "MOR in thousands of p.s.i."

Finally, durability tests were carried out on sections of quarter inch glass plate. This test consisted in immersing the test plate in a 5% hydrochloric acid (HCl) solution at 95° C. for 24 hours and determining, in milligrams per square centimeter (mg./cm.$^2$), the amount of weight loss due to acid attack on the glass surface. Such tests were made both on the annealed glass prior to ion exchange (annealed) and on the glass subsequent to the treatment in the salt bath as described above (exchanged).

TABLE IA

| | Weight percent | | | | |
|---|---|---|---|---|---|
| | 1 | 2 | 3 | 4 | 5 |
| $SiO_2$ | 58.7 | 58.5 | 58.3 | 58.1 | 57.3 |
| $Al_2O_3$ | 17.0 | 15.3 | 13.8 | 12.2 | 14.2 |
| $ZrO_2$ | | 1.9 | 3.8 | 5.6 | 5.5 |
| MgO | 3.5 | 3.5 | 3.4 | 3.4 | 2.5 |
| $Na_2O$ | 12.6 | 12.6 | 12.5 | 12.5 | 12.4 |
| $K_2O$ | 6.1 | 6.1 | 6.1 | 6.1 | 6.0 |
| CaO | 0.5 | 0.5 | 0.5 | 0.5 | 0.5 |
| $As_2O_3$ | 0.9 | 0.9 | 0.9 | 0.9 | 0.9 |
| $TiO_2$ | 0.7 | 0.7 | 0.7 | 0.7 | 0.7 |

TABLE IB

| | Mole percent | | | | |
|---|---|---|---|---|---|
| | 1 | 2 | 3 | 4 | 5 |
| $SiO_2$ | 64.2 | 64.2 | 64.2 | 64.2 | 64.2 |
| $Al_2O_3$ | 10.9 | 9.9 | 8.9 | 7.9 | 9.4 |
| $ZrO_2$ | | 1.0 | 2.0 | 3.0 | 3.0 |
| MgO | 5.7 | 5.7 | 5.7 | 5.7 | 4.2 |
| $Na_2O$ | 13.4 | 13.4 | 13.4 | 13.4 | 13.4 |
| $K_2O$ | 4.3 | 4.3 | 4.3 | 4.3 | 4.3 |
| CaO | 0.6 | 0.6 | 0.6 | 0.6 | 0.6 |
| $As_2O_3$ | 0.3 | 0.3 | 0.3 | 0.3 | 0.3 |
| $TiO_2$ | 0.6 | 0.6 | 0.6 | 0.6 | 0.6 |
| Liquidus (° C.) | 1,004 | 1,004 | 1,014 | 1,064 | 907 |
| MOR in thousands of p.s.i. | 62 | 61 | 57 | 57 | 70 |
| Wt. loss in $HCl_2$ (mg./cm.$^2$): | | | | | |
|   Annealed | 0.55 | 0.50 | 0.11 | 0.06 | 0.08 |
|   Exchanged | 1.3 | 0.50 | 0.20 | 0.11 | 0.13 |
| $T_{1,000}$ poise | 1,410 | 1,408 | 1,383 | 1,365 | 1,407 |
| Strain point (° C.) | 555 | 562 | 556 | 567 | 592 |

TABLE IIA

| | Weight percent | | | | |
|---|---|---|---|---|---|
| | 1 | 6 | 7 | 8 | 9 |
| $SiO_2$ | 58.7 | 57.9 | 57.3 | 56.4 | 60.4 |
| $Al_2O_3$ | 17.0 | 16.7 | 16.5 | 16.3 | 13.6 |
| $ZrO_2$ | | 1.8 | 3.7 | 5.4 | 3.7 |
| MgO | 3.5 | 2.8 | 2.2 | 1.6 | 1.7 |
| $Na_2O$ | 12.6 | 12.5 | 12.4 | 12.2 | 12.5 |
| $K_2O$ | 6.1 | 6.1 | 6.0 | 5.9 | 6.1 |
| CaO | 0.5 | 0.5 | 0.5 | 0.5 | 0.5 |
| $As_2O_3$ | 0.9 | 0.9 | 0.9 | 0.9 | 0.9 |
| $TiO_2$ | 0.7 | 0.7 | 0.7 | 0.7 | 0.7 |

TABLE IIB

| | Mole percent | | | | |
|---|---|---|---|---|---|
| | 1 | 6 | 7 | 8 | 9 |
| $SiO_2$ | 64.2 | 64.2 | 64.2 | 64.2 | 67.0 |
| $Al_2O_3$ | 10.9 | 10.9 | 10.9 | 10.9 | 8.9 |
| $ZrO_2$ | | 1.0 | 2.0 | 3.0 | 2.0 |
| MgO | 5.7 | 4.7 | 3.7 | 2.7 | 2.8 |
| $Na_2O$ | 13.4 | 13.4 | 13.4 | 13.4 | 13.4 |
| $K_2O$ | 4.3 | 4.3 | 4.3 | 4.3 | 4.3 |
| CaO | 0.6 | 0.6 | 0.6 | 0.6 | 0.6 |
| $As_2O_3$ | 0.3 | 0.3 | 0.3 | 0.3 | 0.3 |
| $TiO_2$ | 0.6 | 0.6 | 0.6 | 0.6 | 0.6 |
| Liquidus (° C.) | 1,004 | (*) | (*) | 1,224 | (*) |
| MOR in thousands of p.s.i. | 62 | 59 | 66 | 72 | 53 |
| $T_{1,000}$ poise | 1,410 | 1,423 | | 1,443 | 1,428 |
| Strain point (° C.) | 555 | 571 | 589 | 605 | 558 |

Glass 1 is a base glass having a particularly favorable $K_2O:Na_2O$ ratio for strengthening purposes. However, as indicated the weight loss when this glass is exposed to hot HCl is rather high, especially after ion exchange. This weight loss is substantially diminished in glasses 2,3 and 4 which differ from glass 1 only in substitution of $ZrO_2$ for $Al_2O_3$.

The MgO content in glasses 1-4 is slightly above that permitted in the glasses of the invention. Glass 5 differs from glass 4 only in that 1.5 moles of MgO are replaced by 1.5 moles of $Al_2O_3$ in the composition. This replacement effects a dramatic reduction in liquidus temperature. It also increases the strengthening potential of the glass substantially.

It will be observed that glass 5 has durability characteristics equivalent to those of glass 4. Thus, glasses 1-4, by analogy, illustrate the improvement in durability achieved by adding $ZrO_2$ to glasses of the invention.

The effect of $ZrO_2$ on durability is more clearly shown in FIG. 3 of the appended drawing. In that figure, percent of $ZrO_2$ added to base glass 1 is plotted on the horizontal axis and weight loss of the ion exchanged glass is shown on the vertical axis.

In Tables IIA and IIB, glasses 6, 7 and 8 correspond to glass 1, except that $ZrO_2$ has again been added in one mole percent increments. In this case, the addition is a replacement of MgO in the composition.

The asterisks in the liquidus temperature column indicate that devitrification was observed after 24 hours at any temperature point along the gradient test bar. The glasses of course have a liquidus temperature, but crystal formation is so inhibited that the glass can stand for long periods of time without danger of crystallizing.

Glass 8, however, illustrates the effect of increasing the total $Al_2O_3$ plus $ZrO_2$ content over about 13½%. It will be observed that this glass not only devitrifies but has an exceptionally high liquidus temperature. However, the strengthening potential of this glass, like that of glass 5, is high. This indicates the desirability of maintaining the $ZrO_2$ plus $Al_2O_3$ content as high as other factors permit.

Glass 9 further illustrates that the devitrification tendencies of glass 8 are repressed by cutting back the $ZrO_2$ and $Al_2O_3$ contents, but that strengthening potential is also lost. In this case, half of the MgO content in glass 3 is also replaced by $SiO_2$. This raises the melting temperature without changing the strain point of the glass. This illustrates the desirability of keeping the MgO content as high as other factors permit.

I claim:

1. A strengthened sodium aluminosilicate glass article exhibiting good chemical durability and a low liquidus temperature containing a larger monovalent metal ion selected from the group consisting of silver and alkali metal ions larger in size than sodium, and having a surface compressive stress layer of a depth of at least 5 microns and an interior portion, the concentration of the larger monovalent metal ion being greater in the surface layer than in the interior portion of the article and the concentration of sodium ion being greater in the interior portion of the article than in the surface layer thereof, characterized in that the interior portion of the glass article has a composition consisting essentially, in mole percent on the oxide basis, of 5–25 % $Na_2O$, 1–5% MgO, an amount of $ZrO_2$ effective to improve chemical durability of the strengthened glass but not over 3%, at least 8% $Al_2O_3$, the total $ZrO_2$ plus $Al_2O_3$ being not over 13½%, and the balance essentially $SiO_2$.

2. A strengthened sodium aluminosilicate glass article in accordance with claim 1 wherein the glass composition of the interior portion further contains $K_2O$ in an amount not exceeding five mole percent.

3. An article in accordance with claim 2 wherein the $K_2O$ content is at least four mole percent.

4. An article in accordance with claim 1 wherein the larger monovalent metal ion having a greater concentration in the surface layer is potassium.

References Cited

UNITED STATES PATENTS

| Number | Date | Name | Class |
|---|---|---|---|
| 3,455,706 | 7/1969 | Takagi et al. | 106—52 X |
| 3,485,702 | 12/1969 | Mochel | 161—1 |
| 3,529,946 | 9/1970 | Mischer et al. | 65—30 |
| 3,524,737 | 8/1970 | Doyle et al. | 65—30 |
| 3,540,893 | 11/1970 | Petticrew | 65—30 |
| 3,481,726 | 12/1969 | Fischer et al. | 65—30 |
| 3,573,077 | 3/1971 | Beall et al. | 65—30 |
| 3,637,453 | 1/1972 | Simmons | 65—30 |

FOREIGN PATENTS

| Number | Date | Country |
|---|---|---|
| 1,171,527 | 11/1969 | Great Britain. |
| 966,733 | 8/1964 | Great Gritain. |

CHARLES E. VAN HORN, Assistant Examiner

U.S. Cl. X.R.

65—30; 106—52; 161—193